(12) United States Patent
Deng et al.

(10) Patent No.: US 9,596,716 B2
(45) Date of Patent: Mar. 14, 2017

(54) WIRELESS NETWORK SYSTEM AND SMART DEVICE MANAGEMENT METHOD USING LED LIGHTING DEVICES

(71) Applicant: SENGLED OTOELECTRONICS CO., LTD., Tongxiang (CN)

(72) Inventors: Xingming Deng, Tongxiang (CN); Xiaoping Zhu, Tongxiang (CN); Jinxiang Shen, Tongxiang (CN)

(73) Assignee: SENGLED OPTOELECTRONICS CO., LTD, Tongxiang (CN)

( * ) Notice: Subject to any disclaimer, the term of this patent is extended or adjusted under 35 U.S.C. 154(b) by 0 days.

(21) Appl. No.: 14/888,267

(22) PCT Filed: Mar. 31, 2015

(86) PCT No.: PCT/CN2015/075523
§ 371 (c)(1),
(2) Date: Oct. 30, 2015

(87) PCT Pub. No.: WO2015/165317
PCT Pub. Date: Nov. 5, 2015

(65) Prior Publication Data
US 2016/0165659 A1   Jun. 9, 2016

(30) Foreign Application Priority Data
Apr. 30, 2014   (CN) .......................... 2014 1 0184520

(51) Int. Cl.
*H05B 37/02*      (2006.01)
*H04W 84/12*    (2009.01)
(Continued)

(52) U.S. Cl.
CPC ............. *H04W 84/12* (2013.01); *H04L 12/28* (2013.01); *H04L 12/2816* (2013.01);
(Continued)

(58) Field of Classification Search
CPC ........ H04W 84/12; H04W 4/00; H04L 12/28; H04L 12/2816; H04L 2012/2841; H05B 33/0842; H05B 37/00; H05B 37/0272
(Continued)

(56) References Cited

U.S. PATENT DOCUMENTS 8,473,619 B2 * 6/2013 Baum .................... G08B 25/14
                                                                  706/46
2015/0054947 A1 * 2/2015 Dawes ................. H04L 65/607
                                                                  348/143

FOREIGN PATENT DOCUMENTS

CN   102568182 A   7/2012
CN   102591307 A   7/2012
(Continued)

OTHER PUBLICATIONS

The World Intellectual Property Organization (WIPO) International Search Report for PCT/CN2015/075523 Jul. 9, 2015.

*Primary Examiner* — Daniel D Chang
(74) *Attorney, Agent, or Firm* — Anova Law Group, PLLC

(57) ABSTRACT

The present disclosure provides a wireless network system and a smart device management method using LED lighting devices. The wireless network system includes a wireless router and a plurality of LED lighting devices with WI-FI modules that have wireless access and network switch capabilities. Through the WI-FI modules, the LED lighting devices may access the wireless network provided by the wireless router or the WI-FI modules of any other LED lighting devices that have been wirelessly connected to the wireless router. The network address of the wireless router and the network addresses of the LED lighting devices are in the same network segment. The present disclosure provides a wireless switch cascade method. The WI-FI module of the LED lighting device has wireless switch capabilities, (Continued)

allowing the IP address of the accessed devices and the module itself to be in the same network segment, and enabling centralized control of the connected devices. The smart devices in a home or office environment therefore are not limited by space and can wirelessly interconnect freely, further enhancing the users' smart home user experience.

15 Claims, 2 Drawing Sheets

(51) Int. Cl.
  *H04L 12/28*  (2006.01)
  *H04W 4/00*  (2009.01)
  *H05B 37/00*  (2006.01)
  *H05B 33/08*  (2006.01)

(52) U.S. Cl.
  CPC .......... *H04W 4/00* (2013.01); *H05B 33/0842* (2013.01); *H05B 37/00* (2013.01); *H05B 37/0272* (2013.01); *H04L 2012/2841* (2013.01)

(58) Field of Classification Search
  USPC .................................. 315/292, 312; 709/227
  See application file for complete search history.

(56) References Cited

FOREIGN PATENT DOCUMENTS

| CN | 103246275 A | 8/2013 |
|---|---|---|
| CN | 103369790 A | 10/2013 |
| CN | 103561513 A | 2/2014 |
| CN | 103986630 A | 8/2014 |

\* cited by examiner

WIRELESS NETWORK SYSTEM AND SMART DEVICE MANAGEMENT METHOD USING LED LIGHTING DEVICES

CROSS-REFERENCES TO RELATED APPLICATIONS

This application is a national stage patent application of PCT application No. PCT/CN2015/075523, filed on Mar. 31, 2015. This application claims the priority of Chinese Patent Application No. 201410184520.2, entitled "Wireless Network System and Smart Device Management Method using LED Lighting Devices," filed on Apr. 30, 2014, the entire contents of which is incorporated herein by reference.

FIELD OF THE DISCLOSURE

The present disclosure relates to the field of wireless network technologies and, more particularly, relates to a wireless network system using LED lighting devices and a smart device management method thereof.

BACKGROUND

LED (Light Emitting Diode) is a solid-state semiconductor device that can directly convert electrical energy to visible light. LED technologies provide many advantages including high energy efficiency, eco-friendliness, controllable lighting, being highly practical, high stability, short response time, long lifespan, etc. To promote low carbon living and protect environment, LED technologies have been widely adopted in various lighting applications.

WI-FI technology enables personal computers, hand-held devices (such as PDAs, mobile phones) and other smart terminals to interconnect with each other wirelessly, and is widely used in connecting and forming network with a variety of network terminals.

With the development of smart technologies, home life is also becoming more intelligent. Smart home technologies can link a variety of devices in the house together (such as audio and video equipment, lighting system, curtain control, air conditioning control, security system, digital cinema system, network appliance, and system for automatically reading and sending utility bills, etc.) through network technologies, and provide a variety of functions including appliance control, lighting control, curtain control, telephone remote control, indoor and outdoor device remote control, anti-theft alarm, environmental monitoring, HVAC control, infrared repeater and programmable timing control, enabling a full range of information interaction capabilities. Smart home technologies not only help families to maintain a smooth external information exchange flow, optimize people's lifestyle, and use time efficiently, but also enhance home life security, and can even save money in energy costs.

In order to achieve interconnections among a variety of devices in a smart home, it is critical to set up the home network. Currently there are two options to build the network: wired and wireless. Users often like to perform data communication at any place, which cannot be realized by fixed-wire networks. The fast development of wireless communication technologies has brought new opportunities to home network building technologies. Currently, one option to set up the WI-FI network is using a home wireless router, which provides a wireless network that connects with other terminals and appliances. However, as the signal coverage area of the wireless router is limited, it is relatively difficult to build a complete network with this option. Further, this option cannot realize interconnection between smart terminals and appliances. An alternative option to build WI-FI network is using cascade connection of several wireless routers. However, after cascading, the IP address of each smart terminal is not in the same network segment, it is not only complicated for the smart terminals and appliances to access the network, but also difficult to set up centralized control. Therefore, a wireless network system with wide coverage, convenient access, and ability to achieve interconnections among connected devices would be beneficial. The disclosed method and system are directed to solve one or more problems set forth above and other problems.

BRIEF SUMMARY OF THE DISCLOSURE

The objective of the present disclosure is to provide a wireless network system using LED lighting devices and a smart device management method thereof, which has wide coverage, convenient access, and ability to achieve interconnections among connected devices. The to-be-connected device can freely connect wirelessly without being limited by space, so that the users' smart home experience can be further enhanced.

One aspect of the present disclosure provides a wireless network system using LED lighting devices, comprising: a wireless router and a plurality of LED lighting devices. The LED lighting devices include WI-FI modules that have wireless access and network switch capabilities. Through the WI-FI modules, the plurality of LED lighting devices may access the wireless network provided by the wireless router. Alternatively, the LED lighting devices may access the wireless network provided by the WI-FI modules of any other LED lighting devices that already have been wirelessly connected to the wireless router. The network addresses of the wireless router and the LED lighting devices are in the same network segment.

Another aspect of the present disclosure provides a smart device management method using LED lighting devices. A home or work environment may provide a wireless router, one or more smart terminals, and a plurality of LED lighting devices distributed at different locations. The LED lighting devices include WI-FI modules that have wireless access and network switch capabilities. Through the WI-FI modules, the plurality of LED lighting devices may access the wireless network provided by the wireless router. Alternatively, the LED lighting devices may access the wireless network provided by the WI-FI modules of any other LED lighting devices that have been wirelessly connected to the wireless router. Similarly, the smart terminals are also connected to the above-mentioned wireless network. The network addresses of the wireless router, the LED lighting devices and the smart terminals are in the same network segment. Therefore, any two smart terminals or LED lighting devices may interconnect with each other, enabling a centralized control and management.

Another aspect of the present disclosure provides a smart device management method using LED lighting devices. The method includes providing a wireless router and one or more smart terminals and providing the LED lighting devices with WI-FI modules that have wireless access and network switch capabilities. Further, the method includes connecting, by the LED lighting devices, through the WI-FI modules, to the wireless network provided by the wireless router or the WI-FI module of any other LED lighting devices that have been wirelessly connected to the wireless router. The method also includes connecting smart terminals to the wireless network and assigning network addresses to the LED lighting devices and network addresses to the smart terminals. Further, the network addresses are in a same network segment as a network address of the wireless router.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
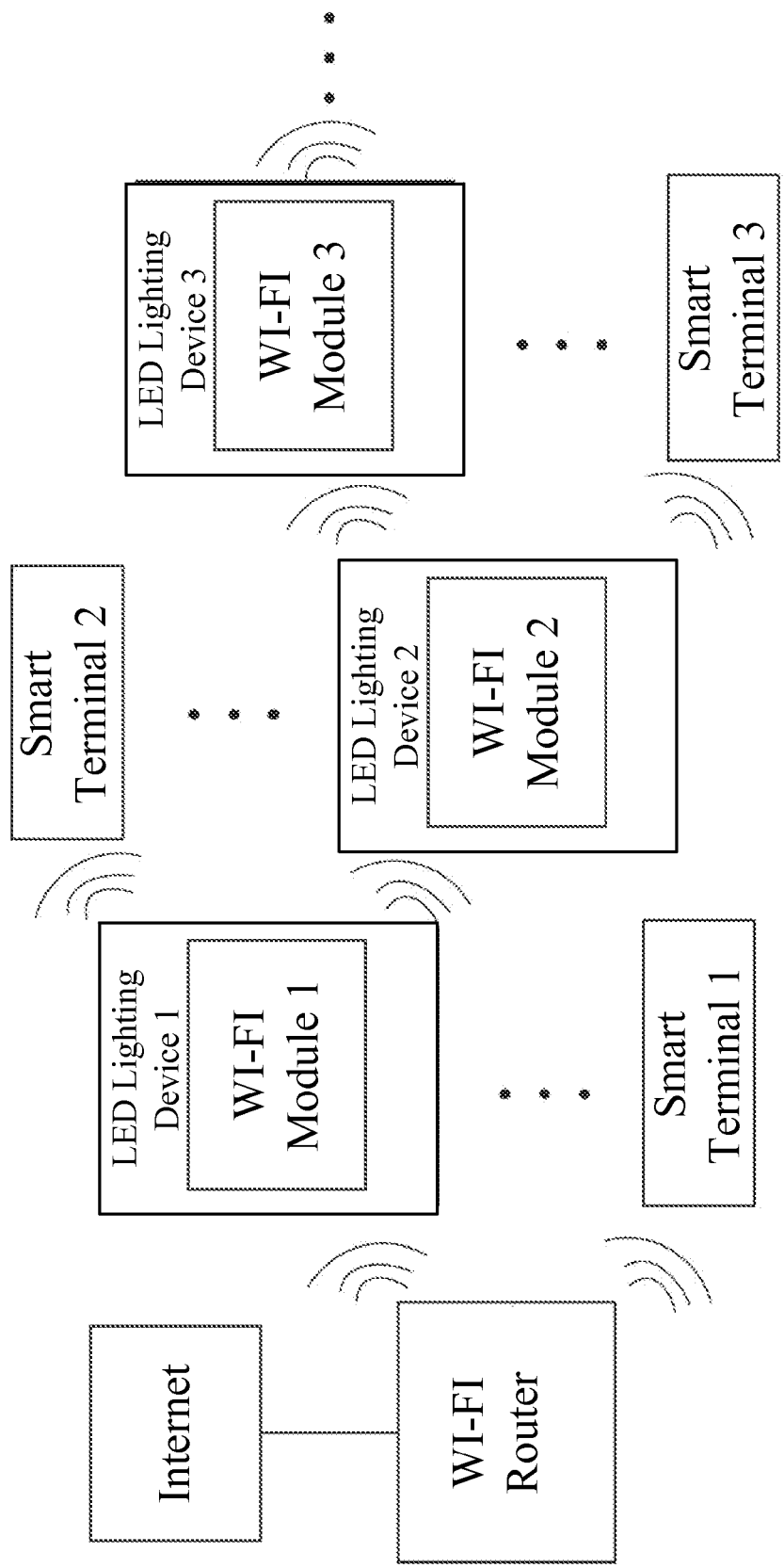
FIG. 1 is a structure diagram illustrating an exemplary wireless network system using LED lighting devices consistent with the present disclosure.

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

The present disclosure provides a wireless network system using LED lighting devices, which provides wide range coverage, convenient access, and ability to achieve interconnections between connected devices. The devices can freely connect wirelessly without being limited by space, which enhances the users' smart home experience.

Specifically, one embodiment consistent with the present disclosure provides a wireless network system using LED lighting devices including a wireless router and a plurality of LED lighting devices. The LED lighting devices include WI-FI modules that have wireless access and network switch capabilities. Further, the WI-FI module may be installed inside the LED lighting device, or attached on an outer surface of a housing of the LED lighting device. Through the WI-FI modules, the plurality of LED lighting devices may access the wireless network provided by the wireless router. Alternatively, the LED lighting devices may access a wireless network provided by the WI-FI module of any other LED lighting device that has been wirelessly connected with the wireless router. The network addresses of the wireless router and the LED lighting devices may be in the same network segment.

The WI-FI module of the LED lighting device may have the capability of a wireless network switch. The wireless network switch may perform data transmission to multiple ports simultaneously. Each port may be considered as an independent physical network segment (not IP network segment). The network device, which is connected to the port, may solely occupy the full bandwidth, without competing with other devices or terminals. The WI-FI module of the LED lighting device itself may provide network switch capabilities and establish exclusive wireless data transmission channel through wireless communication, therefore enabling the obtained IP addresses of the connected devices and the WI-FI module itself to be in the same network segment.

In another embodiment of the present disclosure, the wireless network system may further include one or more smart terminals. The smart terminals access the wireless router or the wireless network provided by the WI-FI modules of the LED lighting devices. The network addresses of the wireless router, the LED lighting devices and the smart terminals are in the same network segment. Any one of the smart terminals or the LED lighting devices may perform information sharing and centralized control through wireless network provided by the wireless router or the other LED lighting devices.

As shown in FIG. 1, the LED lighting devices may include LED lighting device 1, LED lighting device 2, LED lighting device 3, and LED lighting device N. The corresponding WI-FI modules are WI-FI module 1, WI-FI module 2, WI-FI module 3, and WI-FI module N. The smart terminals may include smart terminal 1, smart terminal 2, smart terminal 3, and smart terminal N. In this embodiment, LED lighting device 1 is connected to the wireless network provided by the wireless router through WI-FI module 1. LED lighting device 2 is connected to the wireless network provided by WI-FI module 1 of LED lighting device 1 through WI-FI module 2. LED lighting device 3 is connected to the wireless network provided by WI-FI module 2 of LED lighting device 2 through WI-FI module 3.

Further, smart terminal 1 is connected directly to the wireless network provided by the wireless router. Smart terminal 2 is connected to the wireless network provided by the WI-FI module 1 of LED lighting device 1. Smart terminal 3 is connected to the wireless network provided by the WI-FI module 2 of LED lighting device 2. Any two devices in the network can mutually connect to each other. The number N of the LED lighting devices and the smart terminals may vary according to specific situations. The LED lighting devices and the smart terminals may all select freely to access any searchable wireless networks through the wireless router or the LED lighting devices.

When the wireless router is connected to the Internet, the LED lighting devices may respectively access the Internet through the wireless router or the wireless network provided by other arbitrary LED lighting devices that have been wirelessly connected with the wireless router. The smart terminals may connect to the Internet via the wireless router or the LED lighting devices.

It is understood that the smart terminal may be a telephone, a computer, a cell phone, a smart appliance, etc. That is, any terminals or devices that have wireless access capabilities may be considered as smart terminals and access the wireless network provided by the LED lighting devices or the wireless router.

Preferably, the LED lighting devices may be set up and distributed at different locations in a home environment according to the home layout. Each LED lighting device may be installed within the coverage of the wireless network provided by at least one other LED lighting device or the wireless router. Since LED lighting devices are common and necessary equipment in home life, providing WI-FI modules in the LED lighting devices enables smart control of the LED lighting devices. Further, using LED lighting devices as connection nodes in the wireless network system not only provides a wide range coverage, but also ensures the stability of the wireless network system.

Figure 2:
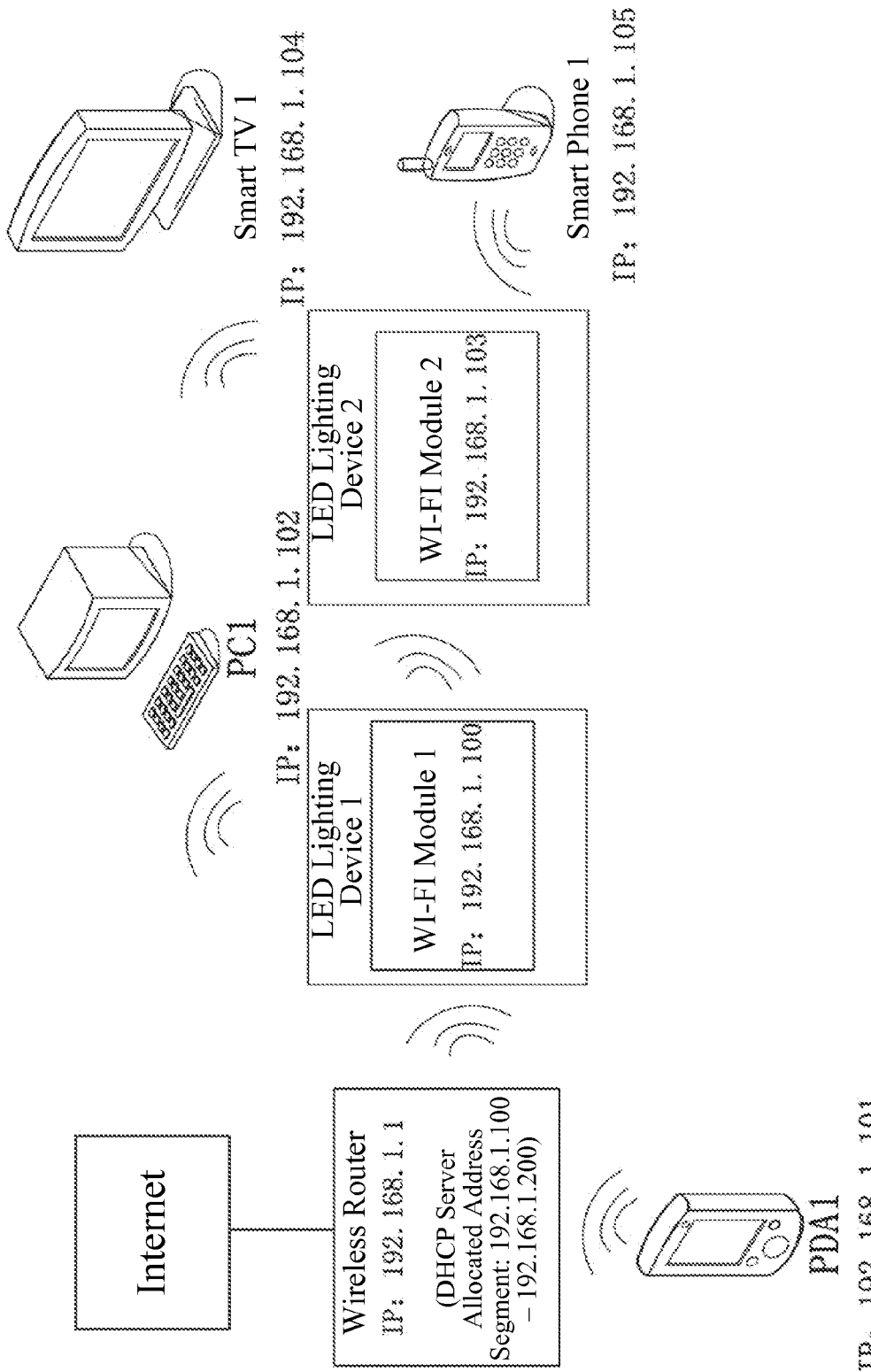
FIG. 2 is a structure diagram illustrating another exemplary wireless network system using LED lighting devices consistent with the present disclosure.

In another embodiment consistent with present disclosure, as illustrated in FIG. 2, the wireless router is connected to the Internet, and its own IP address is configured as 192.168.1.1. The DHCP (Dynamic Host Configuration Protocol) server may allocate the address segment as 192.168.1.100-192.168.1.200. LED lighting device 1 may access the wireless network provided by the wireless router. The IP address obtained by WI-FI module 1 may be 192.168.1.100. In the meantime, PDA 1 may freely choose to access the wireless network provided by the wireless router, with an allocated IP address of 192.168.1.101. LED lighting device 2 may connect to the wireless network provided by LED lighting device 1, with an obtained IP address of 192.168.1.103. Meanwhile, a computer PC 1 may join the wireless network provided by LED lighting device 1, with an allocated IP address of 192.168.1.102.

Further, smart TV 1 and smart phone 1 may respectively access the wireless network provided by LED lighting device 2. The allocated IP addresses for them may be 192.168.1.104 and 192.168.1.105 respectively. WI-FI module 1 of LED lighting device 1, WI-FI module 2 of LED lighting device 2, PDA 1, PC 1, smart TV 1, smart phone 1 are all in the same IP network segment as the wireless router. Therefore, the above-mentioned smart terminals and devices can perform information sharing and centralized control functions among each other through the wireless network channel.

Understandably, the smart terminals or devices, such as PDA 1, PC 1, smart phone 1, smart TV 1, etc., may select freely among accessing the wireless network provided by the wireless router, LED lighting device 1, LED lighting device 2 and other connected LED lighting devices. The obtained IP address may be dynamically allocated in the segment from 192.168.1.100 to 192.168.1.200, which would be in the same network segment.

In certain embodiments, the smart terminals or devices may install an application to control the connected LED lighting devices and other connected devices. The application may provide an interface for users to view and configure the connected devices. For example, a user may browse all connected LED lighting devices at different locations in a home environment, switch on/off certain LED lighting devices according to the user's selection, and adjust brightness, color or color temperature of any connected LED lighting device.

In other embodiments, the wireless router may connect to the Internet. When the smart terminal is not in the coverage range of the wireless network, the smart terminal may connect to the wireless router via the Internet. Therefore, users may monitor and control the working status of the LED lighting devices by the smart terminals, such as smart phones, at any place with internet access.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The present disclosure has several advantages. Comparing to the prior art, the present disclosure provides a wireless network using LED lighting devices, which fully exploits the locations and application characteristics of LED lighting devices in home and work environments. By providing each LED lighting device with a WI-FI module that has wirelessly access point and network switch functions, the LED lighting devices may be used as network nodes, and form a network with a wireless router through wireless switching cascade connections.

When building a network through cascade connection of wireless routers, the network addresses of terminals and devices would not be in the same network segment. It may be difficult to implement fast and convenient mutual access between the smart terminals and devices, and to perform mutual control among the network terminals and devices, therefore not convenient for centralized management of home devices.

The present disclosure provides a wireless switch cascade method. The WI-FI modules of the LED lighting devices have the capabilities of a wireless switch, which enable the IP addresses of the accessed devices and the module itself to be in the same network segment. Therefore, in a wireless network consistent with the present disclosure, any two terminals or devices can interconnect. Such a wireless network has wide range coverage, is easy to access, and enables the connected devices to perform information exchange freely without location limitations. In the entire network structure, the smart terminals or devices can access the network at any location in the network coverage area, and can perform centralized control on the smart devices. The connected devices are no longer limited by space and can wirelessly connect with each other freely, further enhancing the users' smart home user experience.

What is claimed is:

1. A wireless network system using LED lighting devices, comprising:
   a wireless router and a plurality of LED lighting devices, including at least a first LED lighting device and a second LED lighting device;
   wherein:
   the LED lighting devices are configured to have WI-FI modules with wireless access and network switch capabilities;
   the LED lighting devices, through the WI-FI modules, access a wireless network provided by the wireless router or the WI-FI modules of other LED lighting devices that already have been connected to the wireless router, wherein:
   the first LED lighting device is directly connected to the wireless router through the WI-FI module of the first LED lighting device;
   the second LED lighting device is located outside of a signal coverage range of the wireless router, and is located in a signal coverage range of the WI-FI module of the first LED lighting device; and
   the second LED lighting device, through the WI-FI module of the second LED lighting device, accesses the wireless network provided by the WI-FI module of the first LED lighting device that already connected to the wireless router; and
   a network address of the wireless router and network addresses of the LED lighting devices are in a same network segment.

2. The wireless network system using LED lighting devices according to claim 1, further including: one or more smart terminals; wherein:
   the smart terminals select freely to access any searchable wireless network provided by the wireless router and the WI-FI modules of the LED lighting devices; and the network address of the wireless router, the network addresses of the LED lighting devices, and network addresses of the smart terminals are in the same network segment.

3. The wireless network system using LED lighting devices according to claim 2, wherein any one of the smart terminals or the LED lighting devices share data through the wireless network provided by the wireless router and the other LED lighting devices.

4. The wireless network system using LED lighting devices according to claim 2, wherein:
the wireless router is connected to the Internet;
the LED lighting devices access the Internet through the wireless router or through the wireless network provided by the other LED lighting devices that have been wirelessly connected to the wireless router;
the smart terminals connect to the Internet via the wireless router or the LED lighting devices.

5. The wireless network system using LED lighting devices according to claim 2, the smart terminal is a mobile phone, a computer, or a smart appliance with wireless access capabilities.

6. The wireless network system using LED lighting devices according to claim 1, wherein: the LED lighting devices are distributed at different locations in a home.

7. A method for managing smart devices using LED lighting devices, comprising:
providing a wireless router, one or more smart terminals;
providing the LED lighting devices with WI-FI modules that have wireless access and network switch capabilities, including at least a first LED lighting device and a second LED lighting device;
accessing, by the LED lighting devices, through the WI-FI modules, the wireless network provided by the wireless router or the WI-FI module of any other LED lighting devices that have been wirelessly connected to the wireless router, wherein:
the first LED lighting device is directly connected to the wireless router through the WI-FI module of the first LED lighting device;
the second LED lighting device is located outside of a signal coverage range of the wireless router, and is located in a signal coverage range of the WI-FI module of the first LED lighting device; and
the second LED lighting device, through the WI-FI module of the second LED lighting device, accesses the wireless network provided by the WI-FI module of the first LED lighting device that already connected to the wireless router; and
connecting the one or more smart terminals to the wireless network;
wherein: a network address of the wireless router, network addresses of the LED lighting devices and network addresses of the smart terminals are in a same network segment, enabling any two smart terminals or LED lighting devices to interconnect and share data.

8. The method for managing smart devices using LED lighting devices according to claim 7, further comprising:
controlling the LED lighting devices through an application on the smart terminal;
wherein the application is configured to:
browse all connected LED lighting devices at different locations,
switch on or switch off an LED lighting device according to a user's selection, and
adjust a brightness, a color and a color temperature of the connected LED lighting devices.

9. The method for managing smart devices using LED lighting devices according to claim 8, wherein:
the smart terminal selects freely to access any searchable wireless network provided by the wireless router and the WI-FI modules of the LED lighting devices; and
when the smart terminal is located outside a coverage area of the wireless network, the smart terminal connects to the wireless router via the Internet and controls the LED lighting devices through the application.

10. A method for managing smart devices through LED lighting devices, comprising:
providing a wireless router and one or more smart terminals;
providing the LED lighting devices with WI-FI modules that have wireless access and network switch capabilities, including at least a first LED lighting device and a second LED lighting device;
connecting, by the LED lighting devices, through the WI-FI modules, to the wireless network provided by the wireless router or the WI-FI module of any other LED lighting devices that have been wirelessly connected to the wireless router, wherein:
the first LED lighting device is directly connected to the wireless router through the WI-FI module of the first LED lighting device;
the second LED lighting device is located outside of a signal coverage range of the wireless router, and is located in a signal coverage range of the WI-FI module of the first LED lighting device; and
the second LED lighting device, through the WI-FI module of the second LED lighting device, accesses the wireless network provided by the WI-FI module of the first LED lighting device that already connected to the wireless router;
connecting the one or more smart terminals to the wireless network; and
assigning network addresses to the LED lighting devices and network addresses to the smart terminals, wherein the network addresses are in a same network segment as a network address of the wireless router.

11. The method for managing smart devices through LED lighting devices according to claim 10, comprising:
connecting a smart terminal with an LED lighting device, wherein the smart terminal and the LED lighting device exchange data.

12. The method for managing smart devices through LED lighting devices according to claim 11, comprising:
controlling the LED lighting device by the smart terminal.

13. The method for managing smart devices through LED lighting devices according to claim 10, wherein the smart devices include any terminal or device with network access and data exchange capacities.

14. The wireless network system using LED lighting devices according to claim 1, wherein:
using the wirelessly access point and the network switch capabilities of the WI-FI modules, the LED lighting devices functions as network nodes to form a network with the wireless router through wireless switching cascade connections.

15. The wireless network system using LED lighting devices according to claim 1, wherein:
one of the smart terminals is connected to the wireless network provided by the WI-FI module of the second LED lighting device; and
the network address of the wireless router, the network address of the first LED lighting device, the network address of the second LED lighting device, and the network addresses of the smart terminal are in the same network segment.

\* \* \* \* \*